Patented Dec. 25, 1951

2,579,482

UNITED STATES PATENT OFFICE 2,579,482

ADHESIVE COMPOSITION OF SULPHITE WASTE LIQUOR, PHOSPHORIC ACID, AND SULFUR DIOXIDE

James E. Fenn, Baldwin, N. Y., assignor of one-tenth to Charles H. Brown, Princeton, N. J.

No Drawing. Application February 17, 1948, Serial No. 9,000

10 Claims. (Cl. 260—17.5)

This invention relates to an adhesive and to the process of making the same, and is a continuation-in-part of my U. S. Patent #2,457,357, granted December 28, 1948.

As is known, gummed tape and gummed paper have a dried adhesive on one or both surfaces, which becomes tacky upon moistening with water. In my copending U. S. application Serial No. 754,765, filed June 14, 1947, now U. S. Patent 2,457,357 granted December 28, 1948, I have disclosed a novel type of adhesive material suitable for gummed tape and gummed paper, and a process of making this adhesive. Briefly, the adhesive disclosed in my copending application, supra, comprises lignone (which is the concentrated waste liquor of the sulfite process of pulp manufacture consisting mainly of salts of ligno-sulfonic acids) treated with a small quantity (of the general order of 1%) of phosphoric acid of 75% $H_3PO_4$ on the liquid basis of the lignone. A range of 0.5 to 3.0% of commercial phosphoric acid (75% $H_3PO_4$ is disclosed in my copending case, supra. The process involves adding the phosphoric acid to the lignone, agitating the mixture, heating the mixture with agitation to a temperature in the range of 175° to 190° F., and cooling while stirring to room temperature. My copending application, supra, also teaches that the acid-treated lignone can be blended with a small quantity of medium viscosity soluble grade polyvinyl-alcohol solution to provide an adhesive having certain highly desirable characteristics.

When this adhesive composed of lignone treated with phosphoric acid is used with the customary relative amounts of plasticizers (such as glucose, glycerine, invert sugar, the glycols or small amounts of salts) normally used in the adhesive industry, the resulting adhesive product is particularly useful as a palletizing adhesive on paper or corrugated board for holding together loaded cartons, because the adhesive has the property of bonding the surfaces of the cartons to the extent where they do not slip or fall apart during loading, shipping and unloading operations and yet enables the cartons to be easily separated without undue tearing of the bonded surfaces in response to a sudden lifting force applied to the cartons. For other adhesive purposes where a strong and permanent bond is required, this phosphoric acid-treated lignone adhesive may, however, be used as a liquid adhesive in blends with other adhesive materials, such as starches, dextrines or resins, but the resulting product will be more expensive and costly to produce because these last materials are relatively expensive compared to the cheaper acid-treated lignone. Where the acid-treated lignone is blended with polyvinyl alcohol and used to replace the relatively expensive animal glues as a remoistening adhesive on gummed tape and gummed papers, it is desirable in the interest of economy to use the minimum quantity of polyvinyl alcohol necessary to achieve the desired results because of the relatively high cost of this polyvinyl alcohol.

I have discovered that a slight quantity of a compound of the type which when mixed in water releases sulfur dioxide or sulfurous acid, like sodium bisulfite, zinc hydrosulfite or sulfur dioxide gas exterts a beneficial effect on the resulting acid-treated lignone adhesive when used on gummed tape. This slight quantity of compound is preferably applied to the lignone during that step in the process of manufacture when the phosphoric acid is added to the lignone and before the material is heated and ready to be blended with polyvinyl alcohol or other additive materials such as dextrines, starches and resins. The quantity of compound used is not sufficient to produce a pronounced bleaching effect, for example 1% of zinc hydrosulfite based on the dry weight of the lignone or similar quantities of other compounds of the foregoing type will have the tendency to keep my adhesive coated tape "alive" for longer periods of time. In other words, the tape will retain all its good qualities for months whereas if none of these compounds are used, the tape will slowly lose its "quick-tack" over a shorter period of time. The term "quick-tack" as used in the gummed tape industry, refers to that property of the tape which causes the glue-film to become so tacky promptly on moistening that it will adhere strongly to surfaces on which the tape is applied, resulting in the tape gripping the surface very tenaciously without slipping even in the presence of a very moist glue-film.

The adhesive of the invention may be used as a remoistening adhesive for gummed tape or gummed paper. This adhesive will comprise lignone treated with a small quantity of phosphoric acid in the manner disclosed in my copending application, supra, and a compound capable of releasing sulfur dioxide when mixed with water and blended with a small quantity of polyvinyl alcohol.

The adhesive of the invention may also be used as a liquid adhesive in which case the acid and sulfur dioxide treated lignone is blended with amylaceous materials such as starches and dextrines, or blended with resins in the form commonly used and well known in the liquid adhesive industry.

In both cases, whether the acid and sulfur dioxide treated lignone is used as a remoistening adhesive or as a liquid adhesive, the compound which releases sulfur dioxide when mixed with water has the effect of maintaining for a long period of time the highly desirable properties which are present when the adhesive is first manufactured.

It is understood by those skilled in the chemical art that the chemical formula of lignone (the concentrated waste liquor of the sulfite pulp process) is unknown. It is for this reason that I cannot advance any theory to account for the highly desirable but unexpected results obtained by the use of the bleach on this acid treated lignone material, in accordance with the teachings of the invention. The results, however, are different from the effects which might be expected by those using bleaches in the gummed tape and adhesive industries.

What is claimed is:

1. An adhesive comprising the concentrated waste liquor of the sulfite-pulp process treated with a small quantity of phosphoric acid and a substance selected from the group consisting of sulfur dioxide and a material capable of releasing sulfur dioxide when mixed with water, the amount of sulfur dioxide used being equivalent to that released by approximately 1 per cent of zinc hydrosulfite.

2. A remoistening adhesive suitable for use on gummed tape and gummed paper, comprising the concentrated waste liquor of the sulfite-pulp process composed of salts of ligno-sulfonic acids treated with a small amount of phosphoric acid and a substance capable of releasing sulfur dioxide when mixed with water, the amount of sulfur dioxide used being equivalent to that released by approximately 1 per cent of zinc hydrosulfite, and blended with polyvinyl alcohol.

3. An adhesive comprising the concentrated waste liquor of the sulfite-pulp process treated with a small quantity of phosphoric acid and sulfur dioxide gas, the amount of sulfur dioxide used being equivalent to that released by approximately 1 per cent of zinc hydrosulfite.

4. An adhesive comprising the concentrated waste liquor of the sulfite-pulp process treated with a small quantity of phosphoric acid and a substance capable of releasing sulfur dioxide when mixed with water, the amount of sulfur dioxide used being equivalent to that released by approximately 1 per cent of zinc hydrosulfite, and blended with a liquid adhesive.

5. An adhesive comprising the concentrated waste liquor of the sulfite-pulp process treated with a small quantity of phosphoric acid and approximately 1% of zinc hydrosulfite.

6. An adhesive comprising the reaction product of the concentrated waste liquor of the sulphite pulp process and a small quantity of phosphoric acid, combined with sodium bisulfite capable of releasing sulfur dioxide when mixed with water, the amount of sulfur dioxide used being equivalent to that released by approximately 1 per cent of zinc hydrosulfite.

7. An adhesive adapted for application in liquid form to sheet material and comprising a mixture whose major ingredient is the reaction product of the concentrated waste liquor of the sulfite pulp process and phosphoric acid equivalent to 0.5% to 3% phosphoric acid of 75% $H_3PO_4$ based on the liquid basis of the waste liquor, where the concentrated waste liquor of the sulfite pulp process and the phosphoric acid are the sole reactants, and a substance capable of releasing sulfur dioxide when mixed with water, the amount of sulfur dioxide used being equivalent to that released by approximately 1 per cent of zinc hydrosulfite.

8. The process of making an adhesive which comprises adding to the concentrated waste liquor of the sulfite pulp process a quantity of phosphoric acid equivalent to 0.5% to 3% of phosphoric acid of 75% $H_3PO_4$ based on the liquid basis of the waste liquor, adding approximately 1% of a compound capable of releasing sulfur dioxide when mixed with water, then heating the resulting product.

9. The process of making an adhesive which comprises adding to the concentrated waste liquor of the sulfite pulp process a quantity of phosphoric acid equivalent to 0.5% to 3% of phosphoric acid of 75% $H_3PO_4$ based on the liquid basis of the waste liquor, adding approximately 1% of a compound capable of releasing sulfur dioxide when mixed with water, then heating the resulting product, and adding a polyvinyl alcohol solution to the acid-treated waste liquor.

10. The process of making an adhesive which comprises adding to the concentrated waste liquor of the sulfite pulp process a quantity of phosphoric acid equivalent to 0.5% to 3% of phosphoric acid of 75% $H_3PO_4$ based on the liquid basis of the waste liquor, adding a quantity of a substance selected from the group consisting of sulfur dioxide and a material capable of releasing sulfur dioxide when mixed with water, the amount of sulfur dioxide used being equivalent to that released by approximately 1 per cent of zinc hydrosulfite, stirring the mixture, heating while stirring, and adding a solution of an adhesive to the acid treated waste liquor.

JAMES E. FENN.

REFERENCES CITED

The following references are of record in the file of this patent:

UNITED STATES PATENTS

| Number | Name | Date |
| --- | --- | --- |
| 757,337 | Nettle | Apr. 12, 1904 |
| 1,114,120 | Coughlin | Oct. 20, 1914 |
| 1,860,043 | Ludwigsen | May 24, 1932 |
| 2,414,327 | Patterson | Jan. 14, 1947 |
| 2,443,889 | Bruce et al. | June 22, 1948 |
| 2,457,357 | Fenn | Dec. 28, 1948 |

FOREIGN PATENTS

| Number | Country | Date |
| --- | --- | --- |
| 101,028 | Austria | Sept. 25, 1925 |
| 341,690 | Germany | Oct. 5, 1921 |
| 581,256 | Germany | July 24, 1933 |